(12) United States Patent
Sun et al.

(10) Patent No.: US 11,799,158 B2
(45) Date of Patent: Oct. 24, 2023

(54) TOP PLATE FOR LASER WELDED LITHIUM-ION BUTTON CELL BATTERY

(71) Applicant: Zhuhai Zhi Li Battery Co., Ltd., Guangdong (CN)

(72) Inventors: Fajiong Sun, Guangdong (CN); Fang Wang, Guangdong (CN); Youqing Yang, Guangdong (CN); Zui Yang, Guangdong (CN); Zhen Li, Guangdong (CN); Yiheng Wang, Guangdong (CN)

(73) Assignee: Zhuhai Zhi Li Battery Co., Ltd., Guangdong (CN)

( * ) Notice: Subject to any disclaimer, the term of this patent is extended or adjusted under 35 U.S.C. 154(b) by 274 days.

(21) Appl. No.: 17/206,114

(22) Filed: Mar. 18, 2021

(65) Prior Publication Data
US 2021/0210813 A1    Jul. 8, 2021

(30) Foreign Application Priority Data

| Dec. 29, 2020 | (CN) | 202011594168.1 |
| Jan. 6, 2021 | (CN) | 202120026157.7 |
| Jan. 19, 2021 | (CN) | 202110071081.4 |

(51) Int. Cl.
| *H01M 50/181* | (2021.01) |
| *H01M 50/56* | (2021.01) |
| *H01M 50/153* | (2021.01) |
| *H01M 10/04* | (2006.01) |
| *H01M 10/0525* | (2010.01) |
| *H01M 50/169* | (2021.01) |
| *H01M 50/109* | (2021.01) |

(52) U.S. Cl.
CPC ..... *H01M 50/153* (2021.01); *H01M 10/0427* (2013.01); *H01M 10/0525* (2013.01); *H01M 50/169* (2021.01); *H01M 50/181* (2021.01); *H01M 50/56* (2021.01); *H01M 50/109* (2021.01)

(58) Field of Classification Search
CPC .......... H01M 50/109; H01M 10/0427; H01M 50/153; H01M 50/181; H01M 50/56; H01M 50/559
See application file for complete search history.

(56) References Cited

U.S. PATENT DOCUMENTS

| 7,858,217 B1 * | 12/2010 | Goda | H01M 50/167 |
| | | | 429/53 |
| 2005/0147878 A1 * | 7/2005 | Miyahisa | H01M 50/536 |
| | | | 29/623.4 |

(Continued)

*Primary Examiner* — Imran Akram (57) ABSTRACT

A rechargeable lithium-ion button cell battery having a sealed housing includes a top flat plate and a round or oval cup sealed by laser at the rim of top plate whereas connecting the opening end of the cup sidewall. The top plate has a centered sandwiched structure including two outer plates at upper and lower position, that clamping one inner pin-like conductive plate by its flange, insulated by a gasket. The upper plate of the outer plates has an asymmetric shape to its center line, which allows asymmetric sealing force applied on the inner pin-like plate flange to act as a safety vent. Inside the sealed housing the anode and cathode electrodes are either spiral wound or stacked with separator to be a round or oval roll, one electrode is connected to the cup, the other electrode is connected to the inner pin-like conductive plate of the top plate.

17 Claims, 4 Drawing Sheets

(56) References Cited

U.S. PATENT DOCUMENTS

| | | | | |
|---|---|---|---|---|
| 2011/0091753 A1* | 4/2011 | Wang | .................. | H01M 50/109 |
| | | | | 429/94 |
| 2011/0171507 A1* | 7/2011 | Kim | .................. | H01M 10/0431 |
| | | | | 429/185 |
| 2012/0315514 A1* | 12/2012 | Guo | .................. | H01M 10/0525 |
| | | | | 429/55 |
| 2014/0038005 A1* | 2/2014 | Yamato | ............... | H01M 50/342 |
| | | | | 429/57 |
| 2015/0132625 A1* | 5/2015 | Miyata | .............. | H01M 10/0525 |
| | | | | 429/94 |
| 2015/0325821 A1* | 11/2015 | Bradwell | ............ | H01M 50/191 |
| | | | | 156/60 |
| 2017/0301899 A1* | 10/2017 | Lee | ..................... | H01M 50/152 |
| 2018/0026238 A1* | 1/2018 | Andou | ................ | H01M 50/574 |
| | | | | 429/185 |
| 2018/0315964 A1* | 11/2018 | Nam | ................. | H01M 50/1243 |

* cited by examiner

TOP PLATE FOR LASER WELDED LITHIUM-ION BUTTON CELL BATTERY

CROSS REFERENCE OF RELATED APPLICATION

The present invention claims priority under 35 U.S.C. 119(a-d) to CN 202011594168.1, filed Dec. 29, 2020; CN 202120026157.7, filed Jan. 6, 2021; and CN 202110071081.4, filed Jan. 19, 2021.

BACKGROUND OF THE PRESENT INVENTION

Field of Invention

This invention relates to the field of rechargeable lithium-ion electrochemical battery, and more particularly to a lithium-ion battery with a very small size used in small electronic devices such as hearing aids, earphones or watches, in a shape of coin or button which is commonly known as a rechargeable lithium-ion button cell or coin cell battery.

Description of Related Arts

Rechargeable lithium-ion and lithium-polymer batteries are used widely in small electronics such as Bluetooth earphones and hearing aids. True wireless stereo and TWS (true wireless stereo) ear buds are widely adopted by consumers worldwide and it is a major trend that traditional earphones develop into to wireless earphones. While wireless earphones are getting smaller and smarter, the battery needs to keep up the energy demand. One of the important trends of improving capacity of lithium-ion button cell is to improve inner space utility ratio for more active materials to be filled in.

Lithium-ion button cell usually has a three-layer sidewall structure, such as U.S. Pat. No. 8,993,148 disclosed by Wang et al, the sidewall contains an inner or top-cup, an insulation gasket and an outer cup or bottom-cup. This three-layer structure has one deficiency that it has occupied the inner space supposed to be used for electrodes. One solution is using one-layer sidewall structure and using laser welding instead of mechanical crimping to assemble the top-cup into the bottom-cup of the battery. According to JP patent JP 2008262826A, Higuchi et al shows how to manufacture a single sidewall button cell with a laser welded top plate. It proposes the button cell only needs one housing cup to contain all the inner electrodes and separator wound together usually called a jelly roll, and laser welded with a top plate on the opening end of the housing cup sidewall, instead of using three-layer sidewall structure and thus saving more internal space. However, it did not disclose the detail of the top plate, such as how the insulation is implemented on the center of the top plate that having both anode and cathode terminals and how to ensure the safety of the battery.

Using one-layer sidewall of housing cup and laser welded with top plate is able to release more space for active materials inside the battery, but it needs a solution to isolate anode and cathode terminals both on the top plate. Such top plate solutions were provided with different designs in some prior arts.

Prior art design such as CN patent 201112427Y used a rivet structure as the first terminal of one electrode with polymer material such as PP or rubber as an insulation gasket between the rivet terminal and outer structure of the top plate that is linked to the second terminal of the second electrode. Rivet means that a pin-like structure is inserted into a hole of the outer structure, then two ends of the pin-like structure are expanded to clamp the outer structure in the middle thereof, thus holding the pin-like structure with the outer structure. The rivet sealing structure is widely used in many kinds of batteries. However, due to the very small size, the rivet is also very small and the expanding area of two ends thereof is also very small, if being used for button cells, and the seal is not as strong as larger batteries as the prior arts described. Due to chemical limitation, the material of the rivet is usually aluminum as cathode terminal because aluminum is resistant to electrolytic oxidation reaction that happens inside the battery. The aluminum rivet pin has to be big and thick and strong enough to keep the two expanded ends to form a reliable seal for long-time usage. Other materials such as stainless steel is able to provide enough strength to make a small rivet, but it is much weaker than aluminum in terms of resisting oxidizing during charge, long time cycle, and long time storage.

Another point may need to be improved that exists in previous button cells is the safety vent. One common way is to use blade or laser to pre-cut a ditch in an L or U or O shape on the outer metal casing as a safety vent in order to release inner gas as safety vent, opening the ditch at its corner by the inner pressure. It is not very easy to produce while simple to understand and has been used for long. However, when the safety vent ditch is broken by the inner pressure, the O-shaped metal piece as safety vent might be pushed away by the inner pressure.

Another way is to use the metal-glass seal as a kind of safety vent. The glass part plays two roles of insulation and connection. Glass is not conductive thus it is able to separate anode and cathode. It links two terminals together. If inner gassing accumulated, it is broken when the inner pressure is higher than the glass linking limit, and the small terminal that is fixed by glass may blow away as a kind of explode, which means failed as a safety vent, though the gas is released. Also such structure is hard to manufacture, and the glass has a potential safety issue. It could blow into pieces and break device that holds the button cell. Therefore, it is not a very good solution.

In the lithium battery jelly roll design, the straight electrode with constant width or height is most commonly used as in some references disclosed. It is easy to manufacture and could speed up production. However, it is not able to use all of the available inner space of the battery. In large cylindrical battery, such as 18650, it only losses a very small percentage of the available inner space. In small battery such as button cell, although the volume of inner space that is wasted by such constant width or height design of the jelly roll is small, but it counts as a much larger percentage of total inner space, result in a significant energy density loss in button cell.

In the battery housing laser welding process, laser will produce high heat around the welding line. It is very possible that the jelly roll would be affected by this heat and causing battery failure. Another issue is that if electrolyte is filled before welding, it might add extra difficulty to welding process. Therefore, the welding difficulties should be considered to make a reliable laser sealed button cell. If electrolyte is filled after welding, it must create a filling hole somewhere on the battery housing, which could cause weakness on the battery.

Therefore, it is the object of the present invention to provide a reliable, minimized top plate of the battery housing, to leave maximum space for inner materials, with single sidewall design, to make the button cell with higher energy density.

It is also another object to provide a novel safety vent intergraded with a top plate sealing structure thus has minimum footprint in the battery, so the battery is safer than prior arts.

It is another object of the present invention to provide a protection ring, to isolate heat from jelly roll during battery housing welding and simplify welding process, so the battery failure rate would be greatly reduced.

It is still another object of the present invention to provide width variable electrode, to maximize the use of the cell inner space.

SUMMARY OF THE PRESENT INVENTION

The objects of the present invention are attained in an electrochemical rechargeable lithium-ion button cell battery briefly described as below:

A top plate which comprises a centered inner conductive structure partially wrapped and insulated by an insulation gasket, sandwiched and fastened by an outer conductive structure which comprises an upper plate and a lower plate, the inner and outer conductive structure is conductively connected to anode and cathode tab respectively. The outer conductive structure has a two-layer structure each layer at upper and lower position containing the inner conductive structure in between, and then forms a clamp to hold the inner conductive structure and the insulation gasket. The two-layer structure on outer conductive structure is made by welding an upper layer of ring-like metal to the lower layer of also ring-like metal plate which is bigger on diameter than the upper laser, usually both are made of stainless steel or nickel plated stainless steel. The insulation gasket is placed in the cavity of the two-layer outer structure and partially wrapping the inner structure plate for insulation. The inner conductive structure is usually a metal plate or a metal pin that has an extended projected flat rim, which acting as a flange to be wrapped by the insulation gasket and is further fastened by the two-layer outer conductive structure. The top plate in the present invention we name it as outer-rivet, because the traditional rivet is a centered pin having two projected rims at either end and positioned in the cavity hole of the outer structure and fastening them together. In contrast, the present invention the inner conductive structure is being fastened by the two-layer outer conductive structure but not fastening the outer conductive structure.

Unlike traditional rivet that the pin must have enough strength, in the present invention the inner conductive structure of the outer-rivet does not require high strength material because it is being pressed and fastened not fastening the outer conductive structure. Thus, the inner conductive structure can use material that more resist to oxidation but less strength, to improve battery reliability. The inner conductive structure is able to be single layer or multiple layers of metal plate such as stainless steel and aluminum, or pin-like structure made by these two metals.

A novel safety vent design is also provided which has an asymmetric shape of the upper plate of the outer conductive structure of the outer-rivet structure. The upper-plate of the outer conductive structure pressed the inner conductive structure on the extended ends thereof, or flange thereof, and asymmetric means that the distance from the center of the inner conductive plate to the edge of the outer conductive structure upper plate is not constant on the whole periphery. Such asymmetric design makes the pressure or fastening force applied on the rim or flange of the inner conductive structure insulated by the insulation gasket becoming different at each point on the whole periphery. So when the battery inner pressure reaches a critical level of the asymmetric upper plate of the outer conductive structure at its smallest hence weakest point thereof on the periphery is the most easy to deform and open, and the inner gas would be released. Meanwhile the inner conductive structure is still being hold in place by the upper-plate of the outer structure, so the battery is still in accordance with the definition of safe by national or international safety standard.

Laser welding would produce heat and could cause battery failure, in the present invention of single sidewall design. A kind of protection of the electrodes of jelly roll while being laser welded is needed. Solutions like using lower-electrodes away from welding line can be used, however waste of inner space. Or insulation tapes like PI tape can be used wrapping the jelly roll. In the present invention, we use a protection ring that placed at the corner of the top plate to cup sidewall just covering the jelly roll from welding line. It could prevent the heat from laser welding transferred to the electrodes thus decrease defect rate.

There are several components such as the top plate centered outer-rivet structure and protection ring would cause the cell inner space becoming irregular not a standard cylinder. Constant width or height of the electrodes and jelly roll could not make full use of all the space because the electrodes have to fit the minimum height of cell inner space to be inserted therein. In the present invention we use one or multiple width of electrodes changing at its full length, thus the jelly roll could adapt to those irregular components and still make full use of the inner space.

Also to fully use the inner space, electrodes current collectors are used as welding tab connecting to the top plate and/or the cup, without using an extra battery tab welded firstly to the current collector and wasting space. To have higher strength of the very think current collectors, 2 layers or 4 layers of the folded current collector tab is used.

Further for the batteries provided by present invention, laser or blade pre-cut of ditches on the battery housing metal either at the top plate or at the cup body could be used, at the shape of L or U, acting as safety vent.

DETAILED DESCRIPTION OF THE PREFERRED EMBODIMENT

Figure 1:
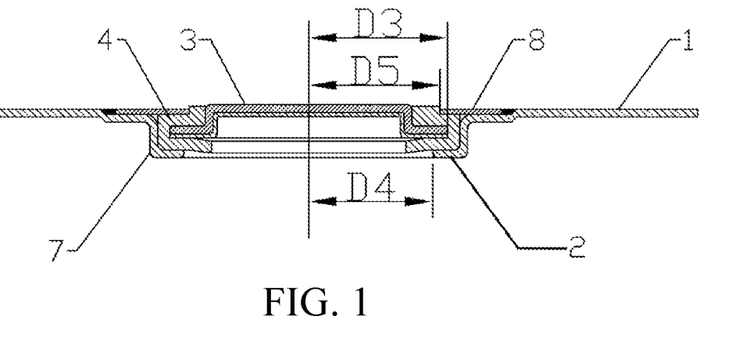
FIG. 1 is a structurally schematic view of a top plate provided by the present invention.
Figure 2:
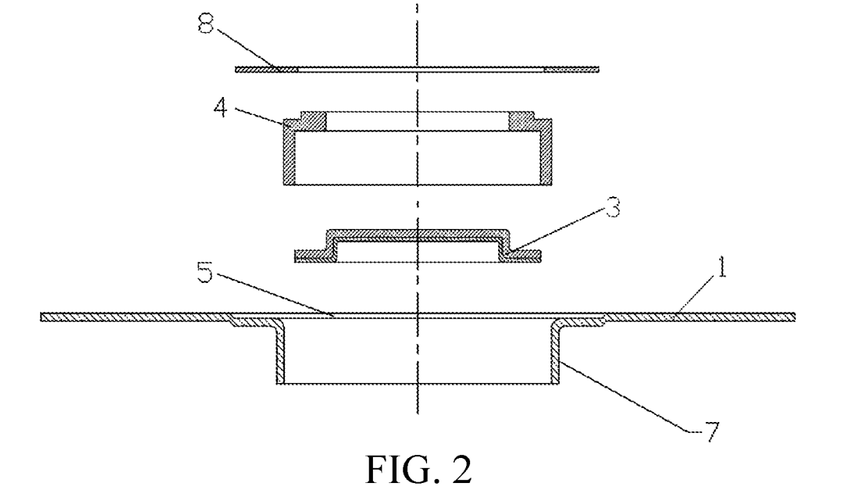
FIG. 2 is an exploded view of the top plate provided by the present invention.

FIG. 1 is a cross-section view a top plate according to a preferred embodiment of the present invention. An outer conductive structure comprises a lower ring-like plate 1 and an upper ring-like plate 8 both of which having a hole, and are connected by laser or plasma welding. The lower plate 1 has an inner sunken end portion flat metal 2 for holding an inner conductive structure 3 and insulation gasket 4. Referring to FIGS. 1 and 2, a sidewall 7 of the lower plate 1 is pressed to a horizontal position for forming the inner sunken end portion flat metal 2, to hold other parts. In such a manner the outer conductive structure then has its upper plate 8 and lower plate 2 as to sandwich the inner conductive structure 3 partially wrapped at its rim as a flange by gasket 4 to complete the assemble of the top plate, so the two conductive structures are fastened together and insulated to each other. Such fastening manner is achieved by the metal force applied from the outer upper plate 8 and outer lower plate 2 to the inner conductive structure 3 insulated by gasket 4, just opposite to traditional rivet, so we name such design as outer-rivet in the present invention.

The lower plate 1 is made of metal such as plated steel, stainless steel, plated stainless steel, aluminum and any other suitable metal materials. The inner conductive structure 3 also needs to be conductive. As shown in FIG. 2 the inner conductive structure 3 is a two-layer structure and comprises materials such as stainless steel as top layer and aluminum as bottom layer. The insulation gasket 4 is made of a polymer or a rubber material such as PP (polypropylene), PI (Polyimide), PET (polyethylene terephthalate), silicone rubber, and fluoride rubber, etc., which is resist to water penetration and doesn't dissolve in electrolyte and nonconductive.

In FIG. 1, D5 is a distance from a geometry center of the inner conductive structure 3 to an edge of the upper plate 8, and is variant for different locations at a periphery point of upper plate 8. This feature of structure is called asymmetric sealing or asymmetric upper layer of the two-layer outer structure of the top plate in the present invention. D5 at the right position is obviously longer then at the left position (not shown) of the same position of center of the inner conductive structure 3 to the edge of upper plate 8. Plate 8 is like a ring, and it could just be made with the inner hole at different center of the outer round rim, so the D5 can be different on different points.

This asymmetric structure provides clamping force for different points on the inner conductive plate 3 rim acting as a flange, which is a key point of this novel design. When an inner pressure increases to a certain point, the top plate 1 and inner plate 3 would start deforming. Because of the clamp force is asymmetric, the right side of shorter-width of metal of the ring-like plate 8 (Larger D5 on right) on plate 3 that has less clamping force would moving upward first, which creates a gap between the inner conductive structure 3 and the insulation gasket 4, and/or a gap between plate 8 and 4, and/or a gap between the inner sunken end portion 2 and the insulation gasket 4, and the gas would be released via this gap on the right side, while the left side still not moving or moving with much less distances so the inner plate 3 is not pushed out of the clamping structure of the two-layer outer structure of the top plate.

The same idea of asymmetric sealing design on the sealing force of the periphery of upper plate 8 is also able to be alternated and be designed on the inner conductive structure 3 that by making the width of inner conductive structure 3 rim of flange not constant at its full periphery or just not fully round. It could be cut a small piece out of its periphery so it is pressed by the upper plate 8 but with asymmetric sealing force on the different width of the inner conductive structure 3 rim of flange which are not shown in the drawings.

Figure 3:
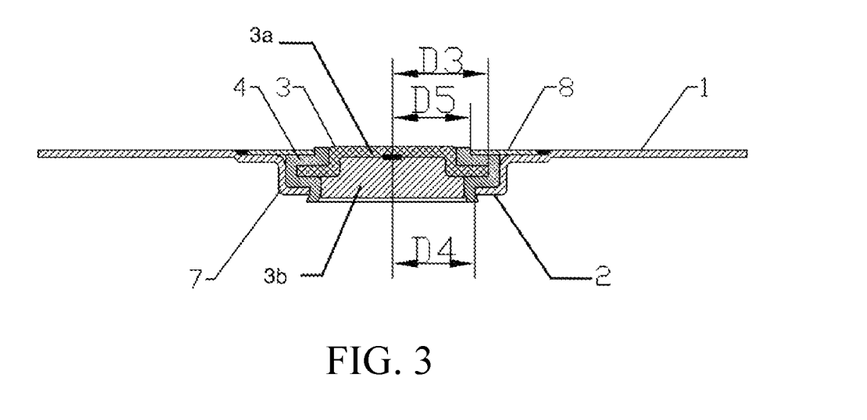
FIG. 3 is a structurally schematic view of another top plate provided by the present invention.

FIG. 3 illustrates another top plate of another preferred embodiment. The inner conductive structure 3 has a two-parts construction. An upper part 3a is welded with a lower part 3b. The issue with single-part structure is that the material if not aluminum then it would be corroded during battery charging by inner electrolyte. It is hard to find a material that is resist to redox reaction, and still has enough strength and good solder performance on the upper surface that needed for battery connection to other circuits. Aluminum would not be affected by the redox reaction due to the $Al_2O_3$ film on the surface, but it is soft and is unable to be soldered on the outside surface. Thus, a composite material would have both the desired feature that are chemically stable and physically strong. Although the inner part that facing the inside of the battery of the lower part 3b looks it would take extra inner space in the figure, the space it took was already a useless space. At the center of the jelly roll is winding axis which is not filled by jelly roll. The difference of FIG. 3 embodiment and FIG. 1. embodiment is that the lower part 3b in FIG. 3 is significantly thicker than FIG. 1. The extra thickness filled the cavity between the inner conductive structure 3 and sidewall 7 in FIG. 1. It greatly reduces the difficulty of welding cathode tab to the inner conductive structure 3, and improves the stability of the connection of the tab and the inner conductive structure 3.

Figure 4:
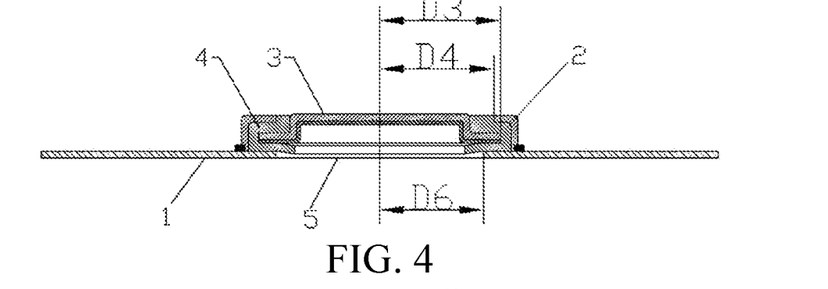
FIG. 4 is a structurally schematic view of another top plate provided by the present invention.

FIG. 4 shows another embodiment of the top plate. The structure is almost the same as FIG. 1. The difference is the lower plate 1 is flat with a hole at center, the upper ring-like plate 8 in FIG. 1. is replaced by a cylinder-shape metal with its top portion pressed down as flat metal 2. The cylinder later is connected to the lower plate 1, usually by welding after the inner conductive plate 3 and the insulation gasket 4 are placed. A variable height of the cylinder sidewall will lead to variable flat area width of the flat metal 2. Such cylinder with variable height on its sidewall will form asymmetric closing structure on top of the flange of inner conductive structure 3.

Figure 5:
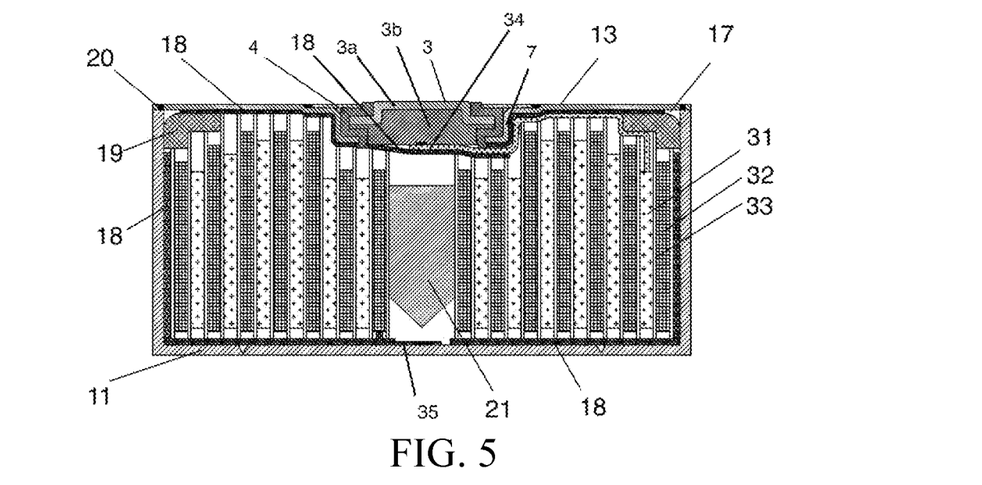
FIG. 5 is a cross-sectional view of a button cell with the outer-rivet structure.
Figure 6:
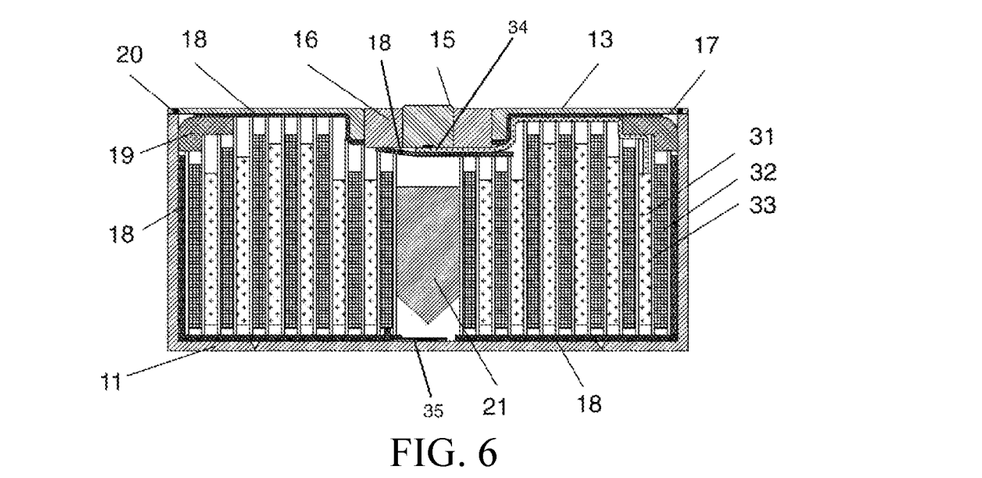
FIG. 6 is the metal-to-glass seal with protection ring and width variable electrodes.
Figure 7:
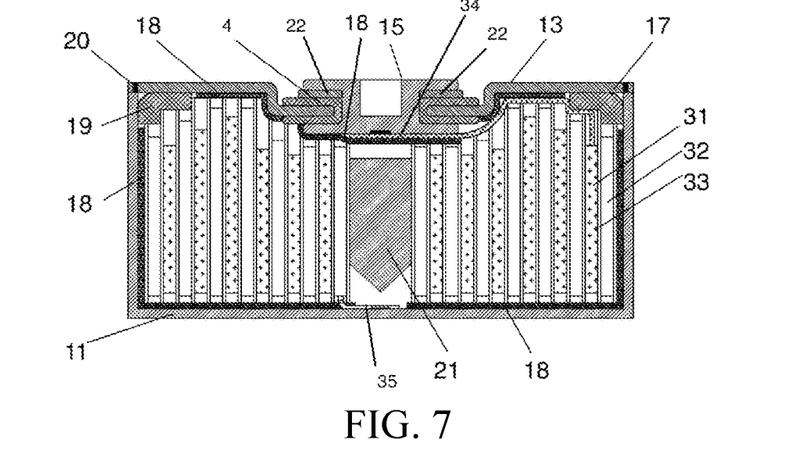
FIG. 7 is the rivet sealing structure with protection ring and width variable electrodes.

FIG. 5, FIG. 6 and FIG. 7 are three different button cells based on three different top plate designs respectively. They have same number of the parts which are: Element 31 is cathode, element 32 is anode, element 33 is separator, element 21 is a pin of plastic to insert and occupy the cavity of jelly roll winding axis. Element 11 is battery housing cup which is made of stainless steel or plated stainless steel, etc., with a round or oval flat bottom and round or oval vertical sidewall just like a cup. Element 18 are insulation means usually tape at different areas at different shapes according to that particular area, fully covering the metal surfaces anywhere inside of the battery housing. Element 20 is the welding line at corner of battery wherein the top plate 13 and housing cup 11 sidewall vertical opening end meets.

The inner sidewall of the cup 11 and the inner surface of top plate 13 could have direct contact with the jelly roll and they are covered by insulation material 18, such as insulating tape. The extended part of current collector acting as tabs 34 and 35 that connecting electrodes to the outer housing of battery also needs to be covered by the insulation material 18, except the area that is facing and further be welded to the outer housing. Another tape 18 is used to cover the welding area of the tab 34 after welding of tab to the inner conductive structure of the top plate.

Figure 9:
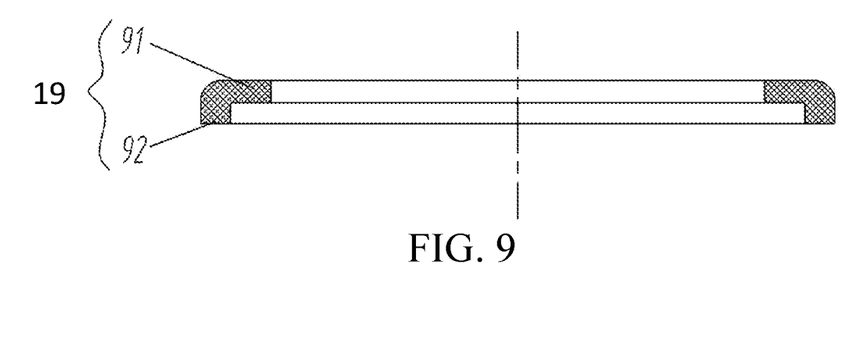
FIG. 9 is a profile view of the heating protection ring.

These three figures all illustrate the protection ring 19 could be used with such laser welded top plate 13 to the cup housing 11 at corner 20. The protection ring 19 is located above the outer shoulder of jelly roll. It could be any shape, the L-shape in FIG. 9 is only one embodiment of the possible design. The material of protection ring could be PP, PE, PI, PET, PEEK or silicone rubber or fluoride rubber. The protection ring 19 has an outer diameter that is the same as the inner diameter of bottom cup 11, and an inner diameter about 0.5-2 mm smaller than the outer diameter, and the thickness of the protection ring is around 0.1-0.5 mm. The protection ring 19 could greatly reduce the effect of heat transfer generated during laser welding or laser direct exposing on jelly roll and protect the jelly roll.

Not illustrated on these three battery design figures, laser or blade pre-cut ditches at L or U shape on the metal of top plate 13 and/or housing cup 11 could be used as safety vent.

In FIG. 5, the inner conductive structure of the top plate 3 is slightly different from FIG. 3. It has a lower part 3b that having a projected flange that matching the flange of upper part 3a. With this flange of 3b it can prevent the electrolyte leaks through small gap between the lower part 3b and the insulation gasket 4 to contact the upper part 3a, which could cause the upper part 3a to be corroded. Since such outer-rivet structure fastening the inner part by applying force vertically on the flange of the upper part 3a and the lower part 3b, it is hard for the electrolyte to move horizontally but relatively easy vertically. Thus, electrolyte might fill the vertical gap between the lower part 3b and the insulation gasket 4. If there is not a flange on the lower part 3b, the electrolyte would have direct contact with stainless steel upper part 3a.

FIG. 6 shows a battery with a top plate made by glass-to-metal seal. Pin 15 is the center metal sealed by element 16 which is made of glass and linked to element 13 which is the outer metal part of the top plate. This is a traditional design used for long time but the inventor of the present invention used new kind of pin 15 made by at least 2 metal materials as explained in example 5 below, and also a protection ring 19 is added for better laser welding performance.

FIG. 7 shows a battery with a top plate made by rivet structure seal. Element 15 is the rivet of the inner conductive structure, extended its two ends horizontally to fasten itself covered by the insulation gasket 4 through the hole of the outer conductive plate 13 of the top plate. A metal plate 22 is used to protect the deforming of insulation gasket 4 when a rivet 15 being punched from top. The center hole of the rivet 15 is used to squeeze the material horizontally to supply the material needs to form the top expanding sealing flange. The rivet 15 is made of aluminum or other materials that resistant to oxidation.

Figure 8:
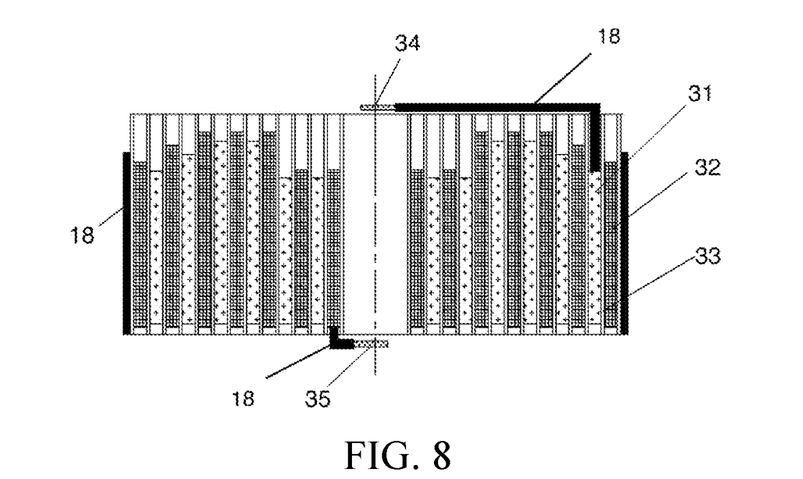
FIG. 8 is the detail of jelly roll used in the present invention.

FIG. 8 shows details of multiple insulation tape 18 on the battery tab 34 and 35 that not shown on other figures because of the difficulty to show at such small scale. The battery tab 34 and 35 could be the extensions of metal foil of the electrodes current collectors, or an extra part usually a small piece of rectangle nickel tab that connected to the current collector foil. The battery tabs 35 and 34 leave the ends for welding respectively to the cup 11 with the tab 35 and the inner conductive structure lower part 3b with tab 34, as in FIG. 5, and all area that not used for welding is fully covered by tapes 18. Center of the jelly roll is lower to contain the sunken outer-rivet structure on the top plate, and outer rim of the jelly roll is also at a lower height to avoid the laser welding line 20 or to contain the protection ring 19.

FIG. 8 also shows each layer of the electrodes of the jelly roll that does not have the same width or height. It is because of the width variable electrodes be used. The protection ring, insulation tape, outer-rivet sealing, and other parts would take the inner space that not available for jelly roll, and they also made the shape of available space irregular. So instead of using constant width or height of rectangular electrodes, they are pre-cut with vary of width or height, to avoid the space that was already taken. It is usually done by laser cutting. This could increase the energy density of the battery.

Figure 10:
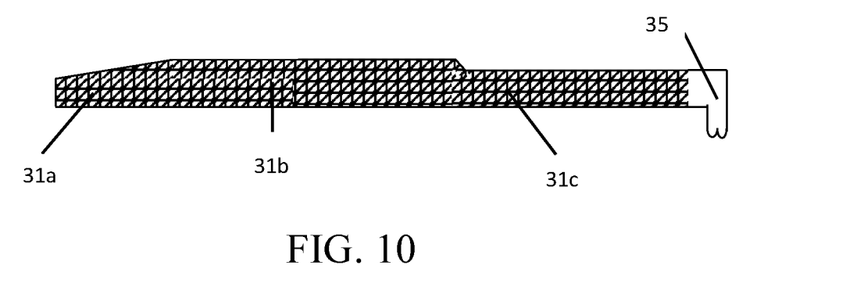
FIG. 10 illustrates anode electrode configuration before winding without extra tab.
Figures 11, 12:
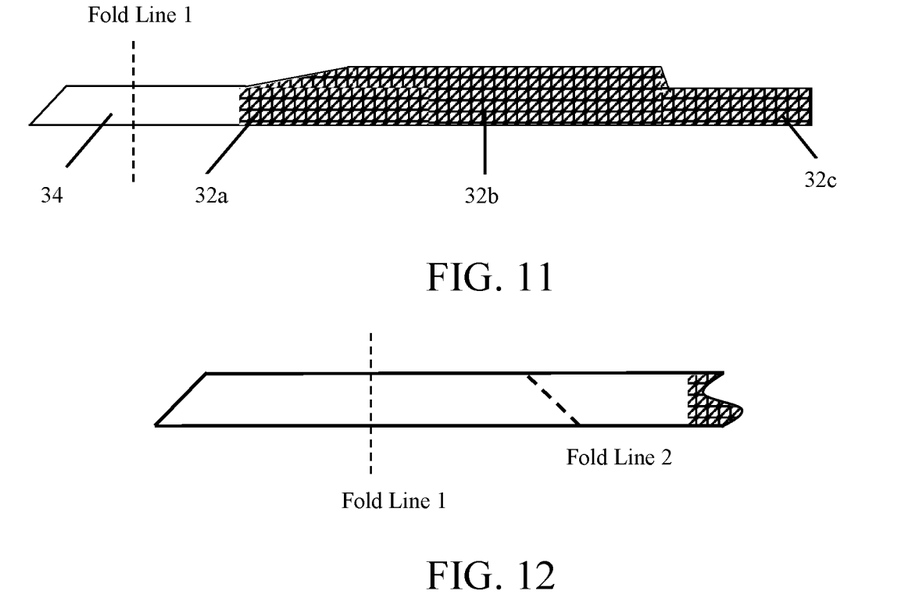
FIG. 11 illustrates cathode electrode with extended current collector configuration before wounding.
FIG. 12 illustrates the first two folding processes on current collector in FIG. 11.

FIG. 10 and FIG. 11 show the anode and cathode electrodes in flat, unrolled form. It could see the width or height of the electrodes is changing in different sections. Area 31a and 32a are tapered located on the outer layers of the jelly roll to avoid welding line and/or containing protection ring 19. Area 31b and 32b are located on the middle layers of the jelly roll. Area 31c and 32c with reduced height or width to avoid the inner conductive structure of the top plate.

Tab 35 in FIG. 10 is an extension of current collector foil, usually us made of copper for anode, will be folded to be double layer at the middle line of the M-shaped cutting, and welded to bottom cup 11 later in battery assembly. Another tab 34 is also an extension of current collector foil, usually aluminum for cathode, and will be folded triple times at fold line 1 to be double layers, then at fold line 2 upward 90 degrees, and then at line 3 tab end 34a to fold downwards to be 4 layers at area 34b, indicated in FIG. 12 and FIG. 13. Tab area 34b is hence much stronger and exposed for welding, and other area of 34c and 34d will be insulated by tape 18 on both sides.

Example 1

As shown in FIG. 1, inventors of the present invention manufactured some top plates for button cell. The diameter of the top plate is varying depends on the needs of the size of the button cell, and is preferably in a range of 5 mm to 15 mm. Outer conductive structure centered ring-like upper plate 8 is stainless steel or nickel plated stainless steel best to have a thickness in a range of 0.05 mm to 0.3 mm and preferably 0.15 mm. An outer diameter of upper plate 8 is at 3 mm to about 6 mm. An inner diameter of upper plate 8 is about 1.5 mm to about 4 mm. The lower plate 1 is also made of stainless steel or plated stainless steel best to have a thickness in a range of 0.05 mm to 0.3 mm most preferably 0.15 mm. Lower plate 1 is same diameter as the final battery at about 5 mm to 15 mm, and has an pre-punched hole at its center at about 3 mm to 6 mm diameter with a vertical sidewall 7 at height of about 0.8 mm to 2 mm. The upper plate 8 is put on top of lower plate 1 and centered with lower plate 1, the they are welded together on the rim of upper plate 8 which is smaller than lower place 1. The most preferred method here is laser welding. After upper plate 8 and lower plate 1 are welded together, it can be called as the outer conductive part of the top plate.

Insulation gasket 4 and inner conductive structure which is plate 3 will be put in the cavity at the center of above made outer part. Gasket 4 is usually polymer material as described above PP, PE, PI, or silicone rubber, or fluoride rubber.

The inner conductive structure 3 has a circular raised plain at its center and a rim or edge is a round flange to be wrapped by gasket 4. The inner conductive structure 3 is able to be single-layered or double-layered. While being single-layered, the inner conductive structure 3 is made of metal such as aluminum; while being double-layered, the inner conductive structure has a lower layer made of aluminum and an upper layer made of stainless steel, nickel or nickel plated steel and coated on the lower layer. FIGS. 1 and 3 show the single-layered inner conductive structure 3 and the double-layered inner conductive structure 3, respectively.

Take the semi-finished top plate into mold and press the vertical sidewall 7 of lower plate hole to make it becomes flat metal 2 of FIG. 1 horizontally and then to press and contain the inner plate 3 and gasket 4 in such sunken space contained by upper plate 8 and lower flat metal 2. The distance D3 which is from the geometry center of the inner conductive structure 3 to a side edge of the inner conductive plate 3, is greater than the distance D5 which is from the geometry center of the inner conductive structure 3 to the inner side edge of upper plate 8 and the distance D4 which is from the geometry center of the inner conductive structure 3 to inner edge of flat metal 2 which is the pressed-down sidewall of sidewall 7 of top plate outer part. Thus the horizontal lower flat metal 2 and upper metal plate 8 clamp the gasket 4 wrapping the flange of inner conductive structure plate 3, forms an reliable and fastened seal area on the flange of the inner conductive structure 3 which is usually cathode terminal to be further linked with cathode electrode tab.

Accordingly, this fastening manner is achieved through a metal force which is applied to the inner conductive structure 3 from the outer parts which lower plate 1 and the upper plate 8, which is opposite to traditional rivet wherein the clamping force is provided by the inner rivet pin expanded two ends, and so it is called outer-rivet in the present invention.

The upper plate 8 of the outer part of the top plate is a ring-like annular piece of metal, and the distance D5 from its inner side edge to the geometry center of the inner conductive structure 3 of the top plate is asymmetric, which means D5 is variant at each points on its whole periphery of upper plate 8. A differences between a minimum D5 and a maximum D5 is in a range of 0.05 mm to 0.5 mm. This can be made simply by forming the center hole of ring-like upper plate 8 at a different circular center than the outer circular center of the upper plate 8, so the two circles of plate 8 inner edge and outer edge are not with same center so the metal width of the ring-like plate 8 becomes different and asymmetric compared to a standard ring which has two circular center at the same point. Such asymmetric structure then provides clamping force differences at different points on the flange of the inner conductive structure 3.

Of course, the upper plate 8 is also able to be a symmetric ring, i.e., the distance D5 from the geometry center of the inner conductive structure 3 to the inner side of the upper plate 8 is consistent, and it also could fulfill the job as safety vent with the symmetrical structure and it is able to randomly open its edge at any point by an inner gassing pressure, which is different from the upper plate 8 with the asymmetrical structure that an opening firstly happens at a point with a minimum clamping force where D5 is maximum or ring width of plate 8 is the minimum.

Example 2

As shown in FIG. 4, another top plate for a button cell is illustrated. The outer ring-like metal plate 1 is flat in this example with a centered hole. A thickness of plate 1 is best in a range of 0.05 mm to 0.3 mm, and the material it used here is stainless steel or plated stainless steel. A cylinder 2 has a variable height and after punched its upper portion to be flat metal, the distance D4 same as example 1 between edge of flat metal and center of inner conductive structure 3 is different on the whole periphery, and the differences of min.D4 and max.D4 is in a range of 0.05 mm to 0.5 mm. The material it used here is also stainless steel. Use laser welding to weld outer plate 1 and cylinder ring 2 on top of it vertically to finish the outer part of the top plate.

Referring to FIG. 4, insulation gasket 4 and inner conductive structure 3 are put in the center cavity of the top plate. Insulation gasket 4 is usually polymer material as described above. At the center of inner conductive structure 3 it has a circular raised plain to be used as battery terminal to the outside circuit. The inner conductive structure 3 is single-layered and is made of metal such as aluminum, or the inner conductive structure 3 is double-layered and comprises a lower layer and an upper layer coated on the lower layer, wherein the lower layer is made of aluminum and the upper layer is made of stainless steel. Then such semi-finished top plate is put into a mold and press the cylinder ring 2 down to horizontal position clamping the inner conductive plate 3 and forms outer-rivet structure with outer conductive structure 3 flange wrapped by gasket 4 and sandwiched in between of outer part upper plate 2 and outer part lower plate of 1.

Since the cylinder ring 2 has variable height and hence D4 is different at each point, the upper part 2 of the ring is putting asymmetric clamping force on the inner plate 3 flange. In FIG. 4, the distance D3 from the center of plate 3 to the edge of plate 3 is greater than the distance D6 from center of plate 3 to inner edge of plate 1 and the distance D4 from center of plate 3 to the upper edge of plate 2. Thus, upper part 2 and lower plate 1 clamp the gasket 4 and plate 3, forms an asymmetric seal which also performs as safety vent.

Example 3

The process of making top plate is the same as example 1, with one exception. Inner conductive structure 3 in example 1 is replaced by a two-parts inner conductive structure 3 as in FIG. 5. The inner conductive structure 3 comprises a lower part 3b and higher part 3a, wherein a projected flange of the lower part 3b matches a flange of the upper part 3a. The upper part 3a is made of stainless steel sheet or plated stainless steel to have better soldering ability. The flange of the upper part 3a is welded together with the flange of lower part 3b which is made of aluminum contacting the inside electrolyte of the battery. Such inner conductive structure 3 is then wrapped by gasket 4 on the welded flanges of upper part 3a and lower part 3b and clamped by the outer-rivet structure of the top plate. Others are the same as example 1.

Example 4

As shown in FIG. 5, inventors of the present invention manufactured some lithium-ion rechargeable button cells using any one of the top plates of the example 1, 2 and 3. The downward surface area of the top plate outer conductive structure is insulated by attaching an insulation tape 18 before assembly with jelly roll.

A battery housing cup 11 is made of stainless steel or nickel plated stainless steel with grade 316, 304 or 430. The thickness of the bottom cup 11 is about 0.1 mm to 0.30 mm most preferably 0.125 mm or 0.15 mm. The housing cup 11 has a single-layer sidewall structure. An inner flat bottom area of the housing cup 11 is covered by the insulation tape 18 except a center leaving a small circle area of about 2 mm diameter where to be welded with the tab of one electrode later.

Pre-cut ditch or ditches as an option, could be used on housing cup 11 and/or the top plate 13 of the metal surface as safety vent too, at L or U shape, to be together used with the asymmetric or non-asymmetric top plate mentioned in example 1, 2 and 3.

To make the electrodes both anode and cathode, first vacuum mix the cathode 31 lithium-intercalating materials preferably LCO and other functional additives in NMP solvent thoroughly to be a slurry. The cathode current collector is made by aluminum foil usually 10 um to 16 um thick, preferably 12 um thick. The cathode lithium-intercalation material is coated with the slurry double sided on the aluminum foil, heated to dry the coated slurry material and press it by a calendaring machine to get the desired thickness usually in a range of 0.1 mm to 0.2 mm. The coating is not on full area of the aluminum foil which leaving a blank area uncoated for the battery tab 34 as showed in FIG. 11. Then the electrode is cut by punching machine or preferably by laser cutting machine to be desired shape as FIG. 11. The anode 32 is made in a similar way except the material and current collector metal foil are different. The coated lithium-intercalating material is graphite, and the current collector is made by copper foil which is 5-12 um thick, most preferably at 6 um. Also the current collector copper foil 31 as in FIG. 10 has an uncoated area 35 further to be double folded on its M shape center to be used as anode tab to be further welded with housing cup 11 on its center of flat bottom area. Non-welded area of tab 35 will then be insulated on both sides by tape before welding.

Figure 13:
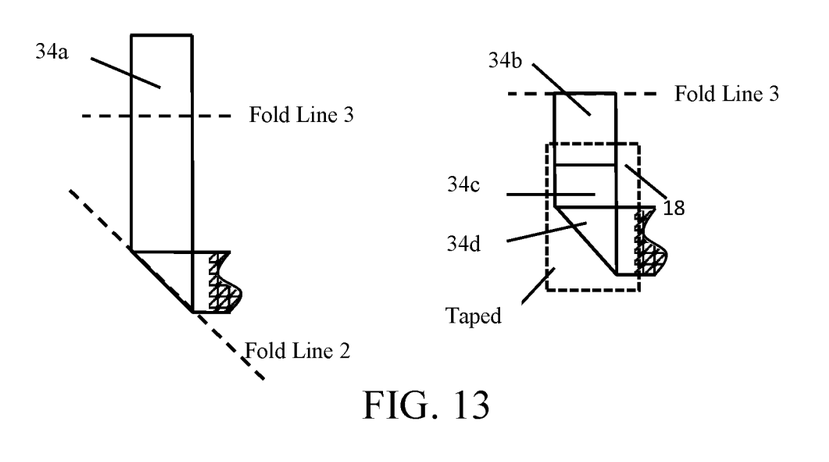
FIG. 13 further shows the tab folding process after FIG. 12 of the cathode current collector.

The cathode tab 34 as an extension of current collector aluminum foil in FIG. 11 will then go through a three-step folding process. FIG. 12 and FIG. 13 shows how the cathode tab 34 in FIG. 11 is folded. In FIG. 12, the tab is first folded from left to right by a fold line 1 then turn 90 degrees folded upward on a fold line 2. After 2nd folding the tab 34a will have been doubled on thickness and shape as in FIG. 13. Further fold the tab 34a by fold line 3 downward, thus 34b would have 4 layers of aluminum foil as tab. Then double-taping the remaining part 34c and 34d to insulate the parts of tab that will not be welded. The bent part 34b with four-layers structure which greatly improve the reliability of the tab not to be broken when it is being welded to the inner conductive structure of the top plate.

Also the height or width of electrode 31 and 32 are not consistent, lower on the beginning or center of jelly roll areas of 31c and 32c to avoid conflict with inner conductive structure 3, 4 and 7, and higher on 31b and 32b, then again lower on 31a and 32a leaving space for the heat protection ring 19 or if the heat protection ring 19 is not used, away from welding line 20. This complicated shape of electrodes gives full utilization of the inner space.

Both a cathode 31 and an anode 32 are spirally wound on a winding machine together with a separator 33. The separator 33 is about 0.5 mm to 1.5 mm wider than the cathode 31 and the anode 32 to prevent short circuit. Referring to FIG. 8, the finished jelly roll with an outer round surface is insulated by the tape 18. Tab 34 of the cathode 31 with all surfaces taped by the insulation tape 18 and insulated except the end-part 34b facing and welded to the lower part 3b of the inner conductive structure 3 of the top plate shown in FIG. 5. Tab 35 is also covered by the insulation tape 18 except the part facing and welded to the center of bottom flat area of the bottom cup 11. The jelly roll then is inserted in bottom cup 11 with the tab 35 welded to the bottom cup 11 by resistance spot welding.

Tab 34 at its end 34b is welded to the inner conductive structure 3b of the top plate by ultrasonic welding or laser welding after the protection ring 19 in FIG. 5 placed above the jelly roll. Then another insulation tape 18 preferably at round shape will be used to covering the welding area of 34b and 3b. Ring 19 could be the same material as described in example 1 insulation gasket 4. Here we used L-shape protection ring, the outer diameter is the same as the inner diameter of the housing cup 11 sidewall.

Such sub-assembly is put into vacuum oven to dry for 24 hours to eliminate any remaining water. Then put it into dry glove box wherein the relative humidity of the air is less than 1% to fill electrolyte usually LiPF6 in solvents by a metering pump. After the electrolyte being absorbed by the jelly roll, top plate is placed on top of the jelly roll and sidewall opening end of cup 11 with its outer rim contacting each other, then laser is used to weld the top plate 13 at corner 20 with cup 11 opening end of sidewall to finally seal the battery.

Then the sealed battery will be aged for at least one day before further activation or formation by slow charging and then to be cycled at least twice to measure the capacity. The battery size Z22F at diameter 7.8 mm height 4.0 mm is made by above method, capacity at 23-24 mAh at 4.2V charging, about 3-4 mAh higher than Z22 at the same size which has traditional 3 layers sidewall mechanical crimping structure as described on the background.

Example 5

In this example the battery manufacturing process is the same as example 4 except the top plate 13 is used. As shown in FIG. 6, a centered inner conductive metal pin 15 is fixed and separated by a ring of glass 16 and the glass 16 at its outer periphery is fixed and separated with an outer metal part of the top plate 13. The metal-to-glass seal has been used for decades basically in high temperature oven to fix and separate two metal parts by glass in between. A cathode tab 34 is then welded to a lower surface of the inner conductive metal pin 15. The pin 15 is able to be made of a single material such as stainless steel, or a composite material of multiple layer metals, with its lower part to be aluminum to be resistant to oxidation of the battery inner electrolyte. Such composite conductive metal pin 15 details are not show in FIG. 6 but is similar to that in FIG. 3 and FIG. 5. The inner conductive structure 3 comprises two metal parts of 3a and 3b, the pin 15 could also be made by at least two metal parts in the same way. Lower part of metal pin 15 can be aluminum and higher part of metal pin 15 can be made of stainless steel, so the battery inside electrolyte will only contact aluminum and not causing corrosion issue on the stainless steel which is at a higher position. These two parts can be welded or pressed conductively together to be the composite metal pin 15.

Example 6

In this example the battery manufacturing process is the same as example 4 except the top plate shown in FIG. 7 is used. An inner conductive rivet 15 of the top plate is wrapped by the insulation gasket 4. The inner conductive rivet 15 has a flat rim as lower flange at lower end which is placed at the inner side of the top plate 13 leaving the other end smaller than the hole of top plate 13 facing outside. Insert the inner conductive rivet 15 through the center hole of the top plate 13, and put steel ring 22 above the insulation gasket 4 from upper side of the top plate. The sub-assembly top plate is then placed on a solid base platform and been pressed by a T-shape punching pin at the center of the inner conductive rivet 15 to squeeze the material to be expanded as the top-flange covering steel ring 22. The punching pin extrudes the upper part of the rivet material and forms a rim as top-flange. The steel ring 22 aids the rim to get evenly formed to be a flange and also protecting the insulation gasket 4 not to be penetrated by punching force. After such process, the conductive rivet 15 has a cavity at the center, and it is wrapped by the insulation gasket 4 and insulated from outer conductive part of the top plate. The two rims at both ends of the conductive rivet 15 act as flanges that fastening the conductive rivet 15 with the outer conductive part of the top plate 13 to complete the assembly.

What is claimed is:

1. A plate as a part of a button cell housing, the plate comprising:
   an insulation gasket;
   an inner conductive structure which comprises a projecting portion as a flange and two end portions; and
   an outer conductive structure, which comprises:
      an upper plate having a hole, and
      a lower plate having a hole, which comprises an inner sunken end portion flat metal for holding the inner conductive structure and the insulation gasket, wherein:
   a sidewall of the lower plate is pressed to a horizontal position for forming the inner sunken end portion flat metal;
   the inner conductive structure and the outer conductive structure are separated and insulated by the insulation gasket;
   the inner conductive structure and the lower plate of the outer conductive structure are conductively connected to two electrodes of a button cell battery respectively;
   a cavity is provided between the upper plate and the lower plate for accommodating the inner conductive structure and the insulation gasket;
   the outer conductive structure is a two-layer structure, wherein the inner sunken end portion flat metal and the upper plate clamp the two end portions of the inner conductive structure through the insulation gasket, such that the inner conductive structure is sandwiched between the upper plate and the inner sunken end portion flat metal, thereby the plate as the part of the button cell housing is formed.

2. The plate of claim 1, wherein a distance from at least one end of the inner conductive structure to a geometry center thereof is larger than a distance from an inner edge of the inner sunken end portion flat metal to the geometry center of the inner conductive structure, the distance from the inner edge of the inner sunken end portion flat metal to the geometry center of the inner conductive structure is larger than a distance from an inner edge of the upper plate to the geometry center of the inner conductive structure.

3. The plate of claim 1, wherein the upper plate faces an outside of the button cell battery, and the lower plate faces an inside of the button cell battery.

4. The plate of claim 2, wherein the upper plate faces an outside of the button cell battery, and the lower plate faces an inside of the button cell battery.

5. The plate of claim 1, wherein the inner conductive structure is a dual-layer structure, one layer of the dual-layer structure which is contact with battery electrolyte is made of aluminum, and another layer of the dual-layer structure which faces the outside of the button cell battery is made of another metal material or a composite metal material.

6. The plate of claim 2, wherein the inner conductive structure is a dual-layer structure, one layer of the dual-layer structure which is contact with battery electrolyte is made of aluminum, and another layer of the dual-layer structure which faces the outside of the button cell battery is made of another metal material or a composite metal material.

7. The plate of claim 3, wherein the inner conductive structure is a dual-layer structure, one layer of the dual-layer structure which is contact with battery electrolyte is made of aluminum, and another layer of the dual-layer structure which faces the outside of the button cell battery is made of another metal material or a composite metal material.

8. The plate of claim 4, wherein the inner conductive structure is a dual-layer structure, one layer of the dual-layer structure which is contact with battery electrolyte is made of aluminum, and another layer of the dual-layer structure which faces the outside of the button cell battery is made of another metal material or a composite metal material.

9. The plate of claim 1, wherein the inner and outer conductive structures are made of a material which is selected from a group consisting of aluminum, copper, nickel, steel, stainless steel, nickel plated steel, aluminum plated metal, aluminum clad metal, carbon coated metal, and a composite material combination by 2 or 3 of these metals.

10. The plate of claim 2, wherein the inner and outer conductive structures are made of a material which is selected from a group consisting of aluminum, copper, nickel, steel, stainless steel, nickel plated steel, aluminum plated metal, aluminum clad metal, carbon coated metal, and a composite material combination by 2 or 3 of these metals.

11. The plate of claim 3, wherein the inner and outer conductive structures are made of a material which is selected from a group consisting of aluminum, copper, nickel, steel, stainless steel, nickel plated steel, aluminum plated metal, aluminum clad metal, carbon coated metal, and a composite material combination by 2 or 3 of these metals.

12. The plate of claim 4, wherein the inner and outer conductive structures are made of a material which is selected from a group consisting of aluminum, copper, nickel, steel, stainless steel, nickel plated steel, aluminum plated metal, aluminum clad metal, carbon coated metal, and a composite material combination by 2 or 3 of these metals.

13. The plate of claim 1, wherein the plate is round or oval fitting a shape of an opening end of a sidewall of a housing cup of a button cell battery whereas the plate is placed on a top thereof.

14. The plate of claim 2, wherein the plate is round or oval fitting a shape of an opening end of a sidewall of a housing cup of a button cell battery whereas the plate is placed on a top thereof.

15. The plate of claim 3, wherein the plate is round or oval fitting a shape of an opening end of a sidewall of a housing cup of a button cell battery whereas the plate is placed on a top thereof.

16. The plate of claim 4, wherein the plate is round or oval fitting a shape of an opening end of a sidewall of a housing cup of a button cell battery whereas the plate is placed on a top thereof.

17. A rechargeable lithium-ion button cell battery, wherein the button cell battery comprises a sealed button cell housing comprising the plate of claim 1 as a top plate and a housing cup having a round or oval flat bottom area and a round or oval sidewall vertically to the flat bottom containing cell electrodes separator and electrolyte, wherein the top plate is laser welded at an opening end of a sidewall of the housing cup.

* * * * *